US009218307B2

(12) United States Patent
McKenney

(10) Patent No.: US 9,218,307 B2
(45) Date of Patent: *Dec. 22, 2015

(54) READER-WRITER SYNCHRONIZATION WITH HIGH-PERFORMANCE READERS AND LOW-LATENCY WRITERS

(71) Applicant: International Business Machines Corporation, Armonk, NY (US)

(72) Inventor: Paul E. McKenney, Beaverton, OR (US)

(73) Assignee: International Business Machines Corporation, Armonk, NY (US)

( * ) Notice: Subject to any disclaimer, the term of this patent is extended or adjusted under 35 U.S.C. 154(b) by 110 days.

This patent is subject to a terminal disclaimer.

(21) Appl. No.: 14/093,426

(22) Filed: Nov. 30, 2013

(65) Prior Publication Data

US 2014/0089606 A1   Mar. 27, 2014

Related U.S. Application Data

(63) Continuation of application No. 13/307,202, filed on Nov. 30, 2011.

(51) Int. Cl.
  *G06F 12/00* (2006.01)
  *G06F 13/16* (2006.01)
  *G06F 9/52* (2006.01)

(52) U.S. Cl.
  CPC .............. *G06F 13/1663* (2013.01); *G06F 9/52* (2013.01)

(58) Field of Classification Search
  None
  See application file for complete search history.

(56) References Cited

U.S. PATENT DOCUMENTS

| 5,875,468 | A  | * | 2/1999 | Erlichson et al. | 711/143 |
| 7,318,126 | B2 | * | 1/2008 | Finkler | 711/144 |
| 7,328,316 | B2 | * | 2/2008 | Moir et al. | 711/150 |
| 7,747,805 | B2 |   | 6/2010 | McKenney | |
| 7,823,150 | B2 | * | 10/2010 | Grcevski et al. | 718/1 |
| 7,930,694 | B2 | * | 4/2011 | Anderson et al. | 718/100 |
| 7,934,062 | B2 |   | 4/2011 | McKenney et al. | |

(Continued)

OTHER PUBLICATIONS

W. C. Hsieh et al., "Scalable Reader-Writer Locks for Parallel Systems", 1991, <http://www.lcs.mit.edu/publications/pubs/pdf/MIT-LCS-TR-521.pdf>, 21 pages.

P. McKenney, "Hierarchical RCU", Linux Weekly News, Nov. 2008, Eklektix, Inc., http://lwn.net/Articles/305782/, 17 pages.

(Continued)

*Primary Examiner* — Charles Rones
*Assistant Examiner* — Matthew Chrzanowski
(74) *Attorney, Agent, or Firm* — Walter W. Duft

(57) ABSTRACT

Data writers desiring to update data without unduly impacting concurrent readers perform a synchronization operation with respect to plural processors or execution threads. The synchronization operation is parallelized using a hierarchical tree having a root node, one or more levels of internal nodes and as many leaf nodes as there are processors or threads. The tree is traversed from the root node to a lowest level of the internal nodes and the following node processing is performed for each node: (1) check the node's children, (2) if the children are leaf nodes, perform the synchronization operation relative to each leaf node's associated processor or thread, and (3) if the children are internal nodes, fan out and repeat the node processing with each internal node representing a new root node. The foregoing node processing is continued until all processors or threads associated with the leaf nodes have performed the synchronization operation.

7 Claims, 8 Drawing Sheets

(56) References Cited

U.S. PATENT DOCUMENTS

| | | | |
|---|---|---|---|
| 8,161,321 B2* | 4/2012 | Zheng et al. | 714/15 |
| 8,176,022 B1* | 5/2012 | Garcia | 707/704 |
| 2002/0138706 A1* | 9/2002 | Hugly | 711/163 |
| 2004/0015642 A1* | 1/2004 | Moir et al. | 711/1 |
| 2004/0143712 A1* | 7/2004 | Armstrong et al. | 711/152 |

OTHER PUBLICATIONS

I. Molnar et al., "Linux/kernel/rcutree_plugin.h", Jan. 2009, 29 pages.

J. Axboe et al., "Linux/kernel/smp.c", Jan. 2008, 12 pages.

R. Russell et al., "Linux/kernel/stop_machine.c", Jan. 2005, 9 pages.

* cited by examiner

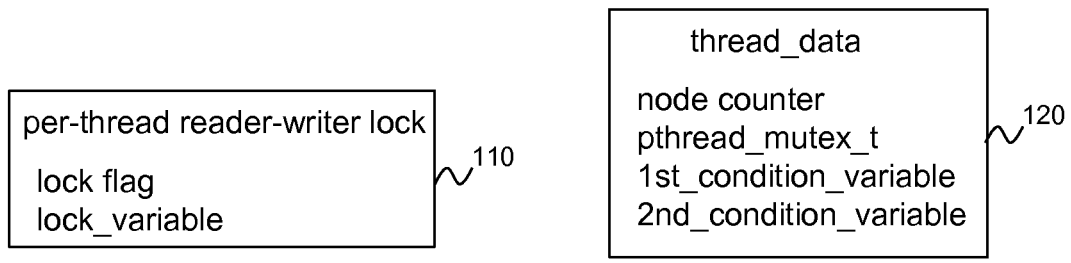
FIG. 9       FIG. 10
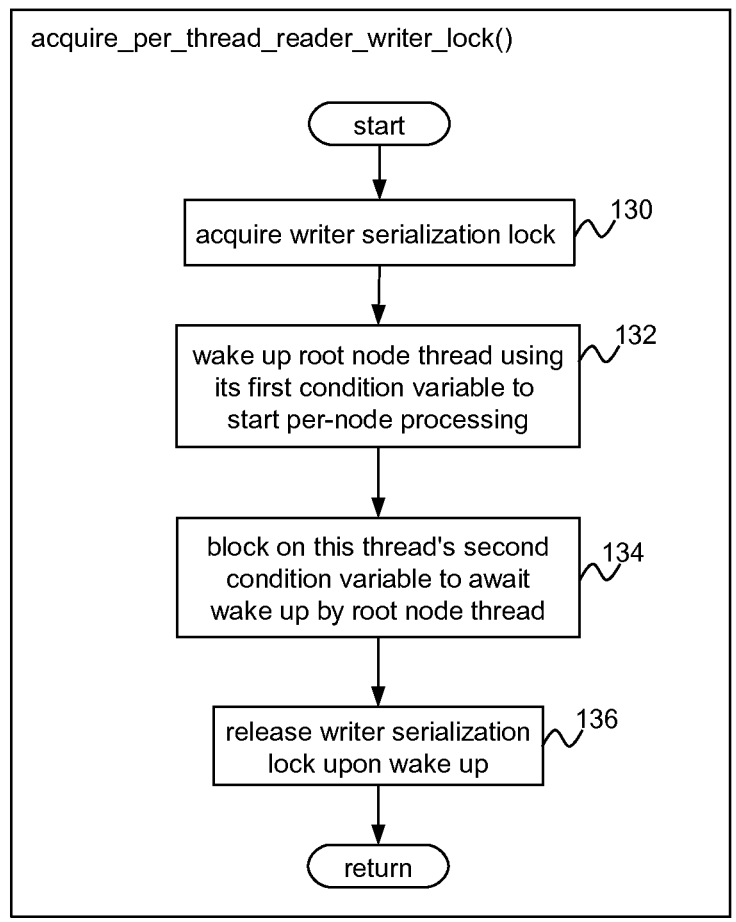
FIG. 11

READER-WRITER SYNCHRONIZATION WITH HIGH-PERFORMANCE READERS AND LOW-LATENCY WRITERS

This application is a continuation under 35 U.S.C. 120 application Ser. No. 13/307,202, filed Nov. 30, 2011, entitled "Reader-Writer Synchronization With High-Performance Readers And Low-Latency Writers."

BACKGROUND

1. Field

The present disclosure relates to computer systems and methods in which data resources are shared among data consumers while preserving data integrity and consistency relative to each consumer. More particularly, the disclosure concerns implementations of mutual exclusion mechanisms such as reader-writer locking.

2. Description of the Prior Art

By way of background, reader-writer synchronization is a mutual exclusion technique that is suitable for use in shared memory multiprocessor computing environments to protect a set of shared data. One type of reader-writer synchronization, known as reader-writer locking, allows read operations (readers) to share lock access in order to facilitate parallel data reads, but requires write operations (writers) to obtain exclusive lock access for writing the data. The technique is well suited to shared memory multiprocessor computing environments in which the number of readers accessing a shared data set is large in comparison to the number of writers, and wherein the overhead cost of requiring serialized lock acquisition for readers would be high. For example, a network routing table that is updated at most once every few minutes but searched many thousands of times per second is a case where serialized read-side locking would be quite burdensome.

Reader-writer locks are conventionally implemented using a single global lock that is shared among processors. This approach requires readers and writers to contend for one global lock on an equal footing, but produces memory contention delays due to cache line bouncing of the lock between each processor's cache. Insofar as reader-writer locks are premised on the existence of a read-intensive processing environment, readers may be unduly penalized, especially if their critical sections are short and their lock acquisition frequency is high. A distributed reader-writer lock approach is presented in Hsieh and Weihl, "Scalable Reader/Writer Locks for Parallel Systems", 1991. It requires the readers to acquire only a local per-processor reader/writer lock that will usually reside in the memory cache of the processor that hosts the acquiring reader. However, the writers must acquire all of the local reader/writer locks, which degrades writer performance due to memory contention, and in some cases due to new readers being allowed to starve a writer while the latter is waiting for one of the local reader/writer locks. A further disadvantage associated with both non-distributed and distributed reader-writer locking is that lock acquisition imposes a burden on readers, even in the absence of a writer. Reader-writer locks are typically implemented as semaphores, mutex locks and spinlocks. Acquiring each of these lock types often imposes the cost of atomic instructions and/or memory barriers. In a read-mostly computing environment, the overhead associated with these operations falls mostly on readers.

Improved read-side performance is provided by the locking technique disclosed in commonly-owned U.S. Pat. No. 7,934,062, which requires no read-side lock acquisition except when a writer announces its intention to acquire the reader-writer lock. However, the write-side performance of this method can be degraded in systems with many processors. This is because writers must wait for a grace period to elapse before acquiring the reader-writer lock. All processors must pass through a quiescent state that guarantees each reader will have an opportunity to note the writer's locking attempt, and thereby synchronize on the reader-writer lock.

The present disclosure introduces techniques for reducing writer latency in large multiprocessor systems that employ data synchronization mechanisms, such as the grace period-based reader-writer locking approach disclosed in U.S. Pat. No. 7,934,062 or the distributed locking scheme proposed by Hsieh and Weihl. A technique for reducing writer latency in a multithreaded user-mode embodiment of the Hsieh and Weihl distributed locking method is also disclosed. The techniques disclosed herein are also useful for other synchronization operations, such as expedited grace period detection in multiprocessor systems implementing read-copy update (RCU) synchronization.

SUMMARY

A method, system and computer program product implement a data synchronization mechanism for synchronizing access to shared data stored in a memory by readers and writers of the data that execute on multiple processors which are operatively coupled to the memory. The synchronization mechanism requires the writers to periodically perform a synchronization operation with respect to a plurality of the processors, or plural threads of execution running thereon. There is established in the memory a hierarchical tree data structure having a set of nodes that includes a root node, one or more levels of internal nodes and a plurality of leaf nodes, there being a leaf node for each of the processors or threads used by the writers to perform the synchronization operation. Each of the leaf nodes, the internal nodes and the root node stores an identifier that associates the node with one of the processors or with one of the threads. The nodes are interconnected by links that establish parent-child relationships between the nodes, such that the hierarchical tree data structure is traversable from the root node through the internal nodes to reach the leaf nodes.

The hierarchical tree data structure is used to parallelize the synchronization operation. This is done by traversing the nodes from the root node to a lowest level of the internal nodes and performing the following node processing for each node: (1) determine whether the node's children are leaf nodes or internal nodes, (2) if the node's children are leaf nodes, perform the synchronization operation with respect to each leaf node's associated processor or thread, and (3) if the node's children are internal nodes, fan out and repeat the node processing using each internal node as a new root node. The foregoing node processing is continued until the synchronization operation has been performed with respect to all processors or threads associated with the leaf nodes.

In an example embodiment, the synchronization operation comprises performing a context switch in order to end a grace period. According to this embodiment, the grace period may be initiated by one of the writers to allow the readers to pass through a quiescent state before the writer acquires a reader-writer lock. In another example embodiment, the synchronization operation comprises acquiring or releasing a per-processor or per-thread reader-writer lock for writing. In a further example embodiment, the node processing is initiated by calling a first function on a processor associated with the root node, the first function passing a second function representing the node processing to be performed by the processor associated with the root node and by processors associated with the internal nodes, the first function also passing a data structure containing a pointer to a third function that performs the synchronization operation, the synchronization operation being implemented by processors associated with the leaf nodes. In a further example embodiment, the node processing is initiated by calling a first function on a processor associated with the root node, the first function passing a second function representing the node processing to be performed by the processor associated with the root node and by processors associated with the internal nodes, the second function also conditionally performing the synchronization operation on behalf of internal nodes whose children are leaf nodes, the synchronization operation being performed by processors associated with the internal nodes to manipulate synchronization entities managed by processors associated with the leaf nodes. In a further embodiment, the node processing is initiated by waking up a helper thread associated with the root node that in turn wakes up helper threads associated with the internal nodes, each of the helper threads performing the node processing for the node with which it is associated, the helper threads also conditionally performing the synchronization operation on behalf of internal nodes whose children are leaf nodes, the synchronization operation being performed by the internal node helper threads to manipulate synchronization entities managed by threads associated with the leaf nodes.

BRIEF DESCRIPTION OF THE DRAWINGS

The foregoing and other features and advantages will be apparent from the following more particular description of example embodiments, as illustrated in the accompanying Drawings, in which:

FIG. 9 is a functional block diagram showing a per-thread reader-writer lock that may be used in accordance with a third embodiment disclosed herein;

FIG. 10 is a functional block diagram showing a thread structure that may be used in accordance with the third embodiment disclosed herein;

FIG. 11 is a flow diagram showing operations that may be performed in accordance with the third embodiment disclosed herein;

DETAILED DESCRIPTION OF EXAMPLE EMBODIMENTS

Figure 1:
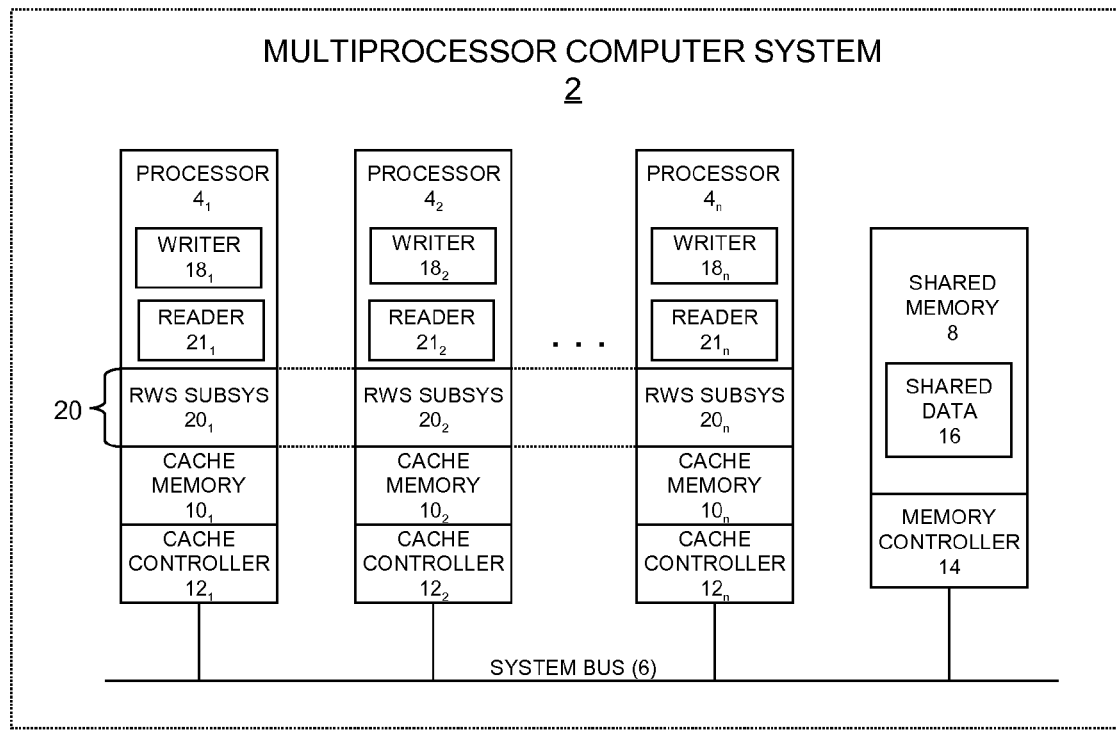
FIG. 1 is a functional block diagram showing a multiprocessor computing system that may be implemented in accordance with the present disclosure.

Turning now to the figures, wherein like reference numerals represent like elements in all of the several views, FIG. 1 illustrates an example multiprocessor (MP) computing system 2 that may be used to implement the data synchronization techniques described herein. In the computer system 2, multiple processors $4_1, 4_2 \ldots 4_n$ are operatively connected by way of a common bus 6 (or other interconnection pathway) to a shared memory 8. Respectively associated with each processor $4_1, 4_2 \ldots 4_n$ is a conventional cache memory $10_1, 10_2 \ldots 10_n$ and a cache controller $12_1, 12_2 \ldots 12_n$. A conventional memory controller 14 is associated with the shared memory 8.

The computer system 2 may represent any of several different types of computing apparatus. Examples of such apparatus include, but are not limited to, general purpose computers, special purpose computers, portable computing devices, communication and/or media player devices, set-top devices, embedded systems, and other types of information handling machines. The term "processor" as used with reference to the processors $4_1, 4_2 \ldots 4_n$ encompasses any logical execution unit capable of executing program instructions, including but not limited to a packaged integrated circuit device (such as a microprocessor), a processing core within a packaged integrated circuit device (such as a microprocessor core), or a hardware thread comprising one or more functional units within a processing core (such as an SMT thread). The processors $4_1, 4_2 \ldots 4_n$ may be situated within a single computing device or node (e.g., as part of a single-node SMP system) or they may be distributed over plural nodes (e.g., as part of a NUMA system, a cluster, or a cloud). The memory 8 may comprise any type of tangible storage medium capable of storing data in computer readable form for use in program execution, including but not limited to, any of various types of random access memory (RAM), various flavors of programmable read-only memory (PROM) (such as flash memory), and other types of primary storage (i.e., program memory). The cache memories $10_1, 10_2 \ldots 10_n$ may be implemented in several levels (e.g., as level 1, level 2 and level 3 caches) and the cache controllers $12_1, 12_2 \ldots 12_n$ may collectively represent the cache controller logic that supports each cache level. As illustrated, the memory controller 14 may reside separately from processors $4_1, 4_2 \ldots 4_n$, for example, as part of a discrete chipset. Alternatively, the memory controller 14 could be provided by plural memory controller instances that are respectively integrated with the processors $4_1, 4_2 \ldots 4_n$.

Each of the processors $4_1, 4_2 \ldots 4_n$ is operable to execute program instruction logic under the control of a software program stored in the memory 8 (or elsewhere). As part of this program execution logic, a write operation (writer) 18 will periodically execute within a process, thread, or other execution context (hereinafter "task") on the processors $4_1, 4_2 \ldots 4_n$. Each writer 18 performs a data write operation on a set of shared data 16 that may be stored in the shared memory 8 (or elsewhere). In FIG. 1, reference numerals $18_1, 18_2 \ldots 18_n$ illustrate write operations that may execute from time to time on the various processors $4_1, 4_2 \ldots 4_n$. The updates performed by the writers $18_1, 18_2 \ldots 18_n$ can include modifying elements of a linked list, inserting new elements into the list, deleting elements from the list, and many other types of operations. Each of the processors $4_1, 4_2 \ldots 4_n$ also periodically executes read operations (readers) $21_1, 21_2 \ldots 21_n$ on the shared data 16. Such read operations will typically be performed far more often than updates, insofar as this is one of the premises underlying the use of data synchronization mechanisms such as read-writer locks. In two of the embodiments described below, the writers $18_1, 18_2 \ldots 18_n$ and the readers $21_1, 21_2 \ldots 21_n$ execute as operating system kernel code paths. In a third embodiment, the updaters $18_1, 18_2 \ldots 18_n$ and the readers $21_1, 21_2 \ldots 21_n$ are implemented as code paths within individual threads of a multi-threaded user-mode application.

Figure 3:
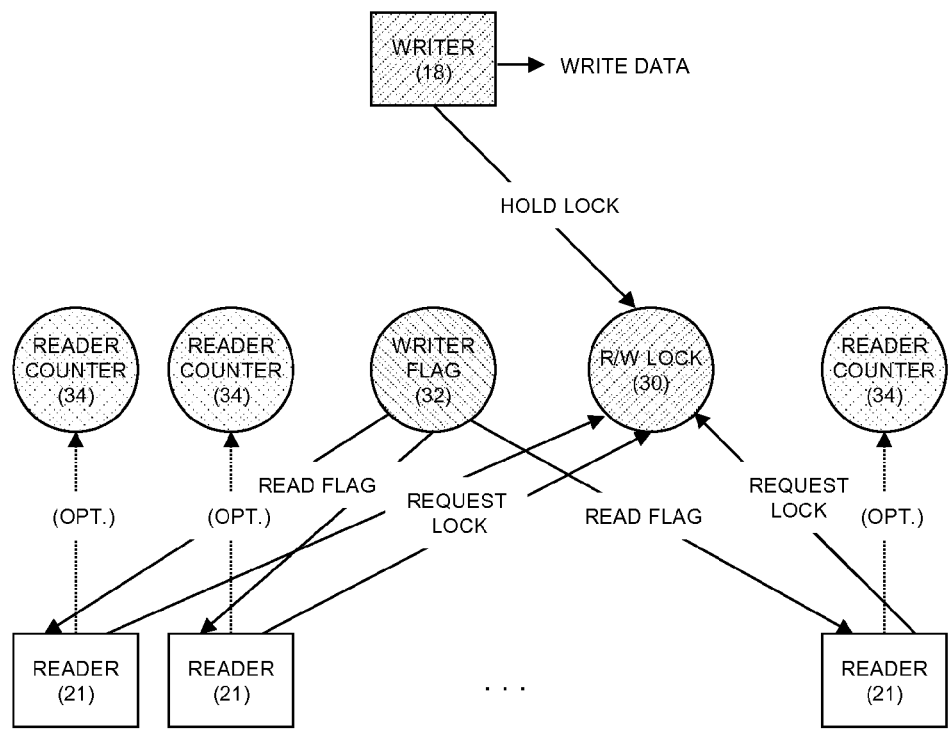
FIG. 3 is a functional block diagram showing a hierarchical tree of nodes that may be used for each of the embodiments disclosed herein.
Figure 4:
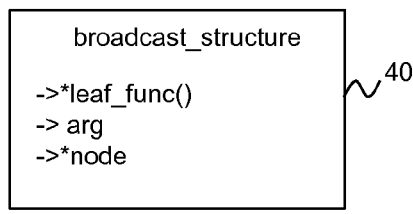
FIG. 4 is a functional block diagram showing an example broadcast data structure that may be used in accordance with the first embodiment disclosed herein.
Figure 5:
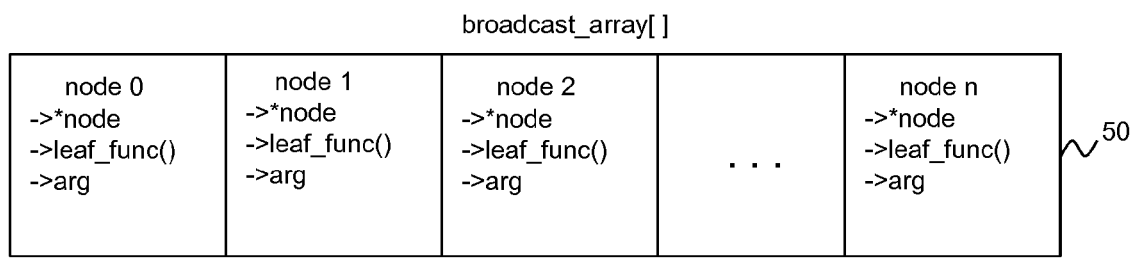
FIG. 5 is a functional block diagram showing an example array that may be used in accordance with the first embodiment disclosed herein.
Figure 7:
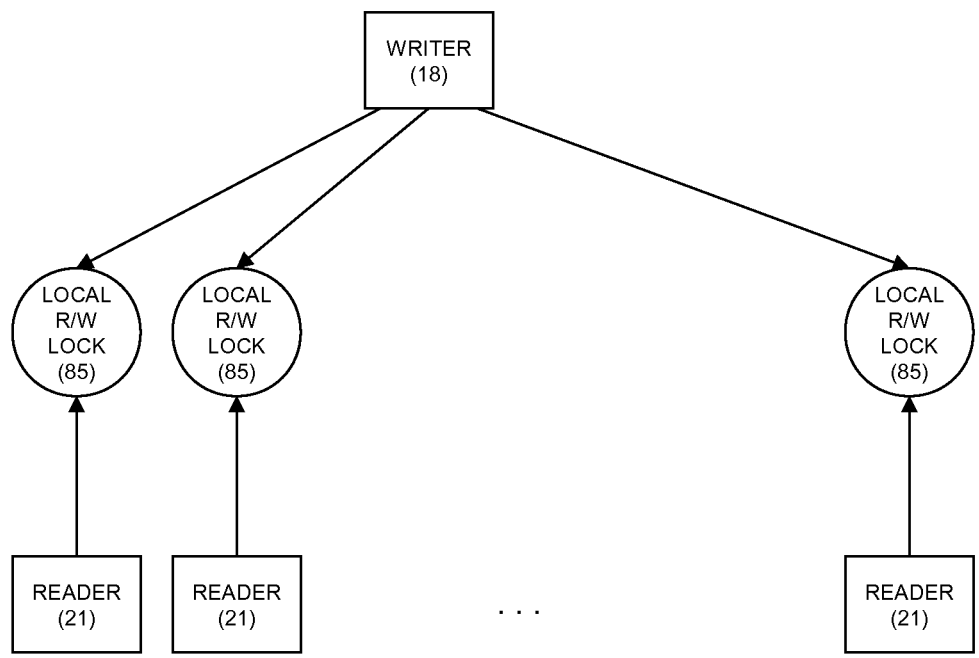
FIG. 7 is a functional block diagram showing a prior art reader-writer locking technique that may be used as a starting point for a second embodiment disclosed herein.

To facilitate synchronized reader-writer access to the shared data 16, the several processors $4_1, 4_2 \ldots 4_n$ are programmed to implement a reader-writer synchronization (RWS) subsystem 20 by periodically executing respective RWS instances $20_1, 20_2 \ldots 20_n$ as part of their operating system functions or user-mode operations. The RWS subsystem 20 may be implemented in various ways. In the first embodiment described below, the RWS subsystem 20 is based on the reader-writer locking technique disclosed in commonly-owned U.S. Pat. No. 7,934,062. Example data structures for this technique are shown in FIGS. 3-5 and will be described in more detail below. In the second embodiment described below, the RWS subsystem 20 is based on the reader-writer locking technique described in Hsieh and Weihl. Example data structures for this technique are shown in FIG. 7 and will be described in more detail below. In each of the first and second embodiments, the RWS subsystem instances $20_1, 20_2 \ldots 20_n$ execute as operating system kernel code paths The third embodiment described below is also based on the Hsieh and Weihl reader-writer locking technique, but operates in the context of a multithreaded user-mode application rather than an operating system. Thus, in the third embodiment, the RWS subsystem instances $20_1, 20_2 \ldots 20_n$ are implemented as code paths within individual threads of a multi-threaded user-mode application. In each of the disclosed embodiments, the reader-writer locking performed by the RWS subsystem 20 is modified in order to reduce writer latency in processing environments having either a large number of processors (first and second embodiments) or a large number of threads (third embodiment).

Hierarchical Tree Data Structure

Figure 2:
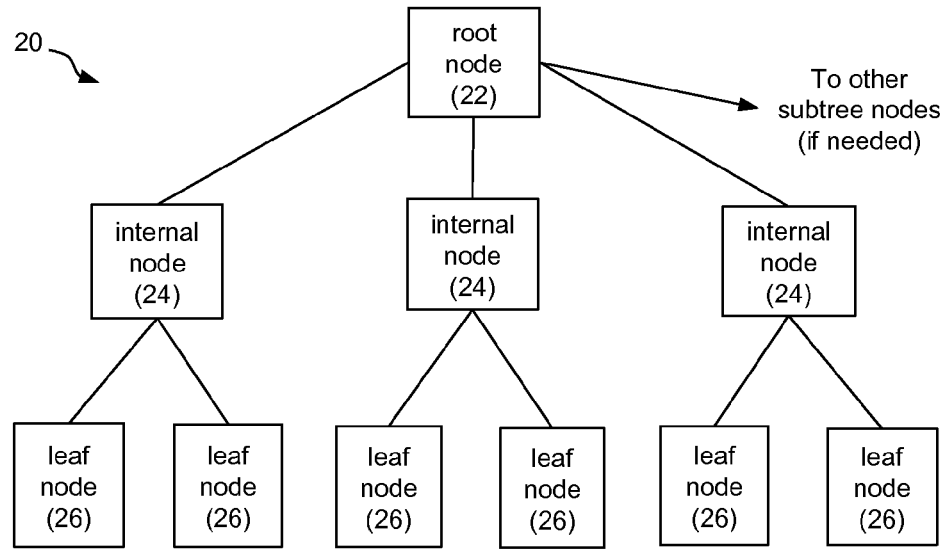
FIG. 2 is a functional block diagram showing a prior art reader-writer locking technique that may be used as a starting point for a first embodiment disclosed herein.

Turning now to FIG. 2, a hierarchical tree data structure 20 (hierarchical tree) is used in each of the three embodiments described below. In the first and second embodiments, the hierarchical tree 20 allows the writers 18 to perform a distributed synchronization operation with respect to each of the processors 4 in the system 2. In the third embodiment, the hierarchical tree 20 allows the writers 18 to perform a distributed synchronization operation with respect to each thread of execution running on the processors 4 in connection with a user-mode application. The specific synchronization operations performed by the writers 18 differ for each embodiment, as does the manner in which the hierarchical tree 20 is utilized.

The hierarchical tree 20 may be established in the memory 8 when the RWS subsystem 20 is initialized. As can be seen in FIG. 2, the nodes that comprise the hierarchical tree 20 include a root node 22, one or more levels of internal nodes 24 (only one level is shown) and plurality of leaf nodes 26. The nodes 22, 24 and 26 are interconnected by links that establish parent-child relationships between the node levels, such that the hierarchical tree 20 is traversable from the root node 22 through the internal nodes 24 to reach the leaf nodes 26. In the first and second embodiments described below, there is one leaf node 26 for each processor 4. In the third embodiment described below, there is one leaf node 26 for each execution thread that runs on a processor 4 as either a writer 18 or a reader 21 in a user-mode application. Each internal node 24 may have some maximum number of leaf nodes 26 (e.g., 64) as its children. The root node 22 may also some maximum number of internal nodes 24 (e.g., 64) as its children. As such, the total number of internal nodes 24, as well as the number of internal node levels, will depend on the total number of leaf nodes 22, which matches the total number of processors (first and second embodiments) or threads (third embodiment) in the system 2. As shown in FIG. 2, additional subtrees may be added to the hierarchical tree 20 to increase the number of nodes and node levels.

Each of the leaf nodes 26 stores an identifier that associates the leaf node with a given processor or thread. Each of the internal nodes 24 and the root node 22 also store an identifier that associates the internal node or the root node with a processor or a thread. Insofar as there are as many leaf nodes 26 as there are processors or threads, a processor or thread that is associated with an internal node 24 or the root node 22 will also be associated with one of the leaf nodes 26. The selection of certain processors or threads to be associated with more than one node 22, 24 or 26 of the hierarchical tree 20 may be handled on a random basis or in any other suitable manner.

The hierarchical tree 20 may change as processors are taken offline or threads are destroyed. In the first and second embodiments wherein each leaf node 26 stores a processor identifier, the identifier may be set to a special offline value (e.g., "−1") if the leaf node's associated processor is taken offline. If that processor is also associated with an ancestor node further up the hierarchical tree 20 (e.g., an internal node 24 or possibly the root node 22), the ancestor node may be associated with a different processor in the corresponding subtree that extends from the ancestor node. If there is no other processor in the corresponding subtree, the ancestor node's processor identifier may also be set to the special offline value. When a processor 4 comes back online, the processor identifier of its associated leaf node 26 and any affected ancestor nodes will be reset. In the third embodiment wherein each leaf node 26 corresponds to a thread, the termination of that thread may be reflected in the hierarchical tree 20 by removing the associated leaf node 26, together with any ancestor nodes that are associated with the same thread. When a thread is created, a leaf node 26 may be added to the hierarchical tree 20, together with one or more new internal nodes 24 if the addition of the new leaf node would cause any existing internal nodes to exceed the maximum number of allowable children. Any number of tree algorithms may be used for the foregoing operations.

The hierarchical tree 20 is used to parallelize reader-writer synchronization operations performed by the writers 18 with respect to plural processors or thread in the system 2. This is done by traversing the hierarchical tree 20 from the root node 22 to a lowest level of the internal nodes 26 and distributing the synchronization operation workload across each internal node subtree encountered during the traversal. The node processing work implemented with respect to the root node 22 and each internal node 24 may be performed as follows: (1) determine whether the node's children are leaf nodes or internal nodes, (2) if the node's children are leaf nodes, perform the synchronization operation with respect to each leaf node's associated processor or thread, and (3) if the node's children are internal nodes, fan out and repeat the node processing using each internal node as a new root node. The foregoing node processing continues until the synchronization operation has been performed with respect to all processors or threads associated with the leaf nodes.

First Embodiment Based on U.S. Pat. No. 7,934,062

In this embodiment, the RWS subsystem 20 of FIG. 1 implements a modified version of the reader-writer locking technique disclosed in U.S. Pat. No. 7,934,062 (hereinafter the '062 patent), the entire contents of which are fully incorporated herein by this reference. With additional reference now to FIG. 3, this technique may utilize a reader/writer (R/W) lock 30, a writer flag 32, and a set of per-processor reader counters 34. The reader/writer lock 30 is acquired by any writer 18 that desires to perform an update operation on the shared data 16. However, before acquiring the reader/writer lock 30, the writer 18 will first set the writer flag 32. Readers 21 desiring to read the shared data 16 will check the writer flag 32 before commencing their read-side critical sections. If the writer flag 32 is set, the readers 21 must synchronize on the reader/writer lock 30. If the writer flag 32 is clear, indicating that their are no waiting writers 18, the readers 21 do not need to synchronize on the reader/writer lock 30. Instead, each reader 21 simply increments one of the per-processor reader counters 34 at the outset of the read operation, then decrements the same counter when the read operation has completed (or a different counter if the reader was moved to a different processor at some point during the read operation). A writer 18 wishing to perform an update on the shared data 16 will set the writer flag 32, then wait for a grace period to elapse, and then observe the reader counters 34 until they collectively drain to zero. The grace period guarantees that all newer readers 21 that were invoked following the update to the writer flag 32 will have a chance to note the flag status. The grace period also guarantees that all older readers 21 that were invoked prior to the update to the writer flag 32 will have a chance to increment their per-processor counters 34 before the writer 18 begins testing the state of the counters.

One mechanism that may be used by writers 18 to implement a grace period in accordance with the '062 patent is to invoke the "synchronize_sched( )" primitive provided by conventional read-copy update (RCU) implementations. It is suggested herein that a faster approach would be to use the synchronize_sched_expedited( ) primitive provided by hierarchical RCU implementations. In current versions of the Linux® kernel, this synchronization operation uses a function called "try_stop_cpus( )" to force each processor in a multiprocessor system to perform an action representing a context switch. This represents a broadcast IPI (InterProcessor Interrupt) that requests all processors to perform the context switch action. Unfortunately, not all platforms support broadcast IPIs, and even those that do may experience operational delays if the number of processors is large.

A solution presented by the present embodiment is to have the writers 18 initiate a distributed synchronization operation that implements a modified form of the synchronize_rcu_expedited( ) primitive, with multi-stage hierarchical broadcast processing being carried out using the hierarchical tree 20 of FIG. 2. This approach allows IPIs to be broadcast in parallel on platforms where broadcast IPIs are not supported, or do not efficiently handle large numbers of processors, or where an alternative to hardware-based broadcast IPIs is otherwise desirable for performance or functional reasons.

In this embodiment, two data structures that are used in addition to the hierarchical tree 20 include a broadcast structure 40 (named "broadcast_structure") and a broadcast array 50 (named "broadcast_array[ ]"), both of which can be created in the writer's call stack (or elsewhere). The broadcast structure 40 is used in the broadcast process. This structure contains a pointer to a leaf node function (called "leaf_func( )") that a processor 4 associated with a given leaf node 26 is to call, an argument ("arg") that is to be passed to that function, and a pointer to the leaf node 26 itself. In the present embodiment, the leaf node function within the broadcast structure 40 would be a function that causes a leaf node's associated processor 4 to perform a context switch, such as the Linux® kernel's try_stop_cpus( ) function. The broadcast array 50 is used during traversal of the hierarchical tree 20 to pass node processing parameters from one level of internal nodes 24 to other. Each array element corresponds to a child internal node 24 and includes a pointer to the child node, a copy of the leaf node function referenced by the broadcast structure, and the argument that is to be passed to that function.

To perform a broadcast IPI that forces a grace period on each processor 4 in the computer system 2, the Linux® kernel's smp_call_function_single( ) function may be called initially on the processor 4 associated with the root node 22 of the hierarchical tree 20. The arguments passed to the smp_call_function_single( ) function are (1) a pointer to the node whose processor 4 is to perform the function, (2) a node processing work function to be executed by the processor, (3) the broadcast structure 40 (which can be allocated as a local variable in the stack frame for the smp_call_function_single( ) function), and (4) an indication that the caller must wait until smp_call_function_single( ) has completed.

Figure 6:
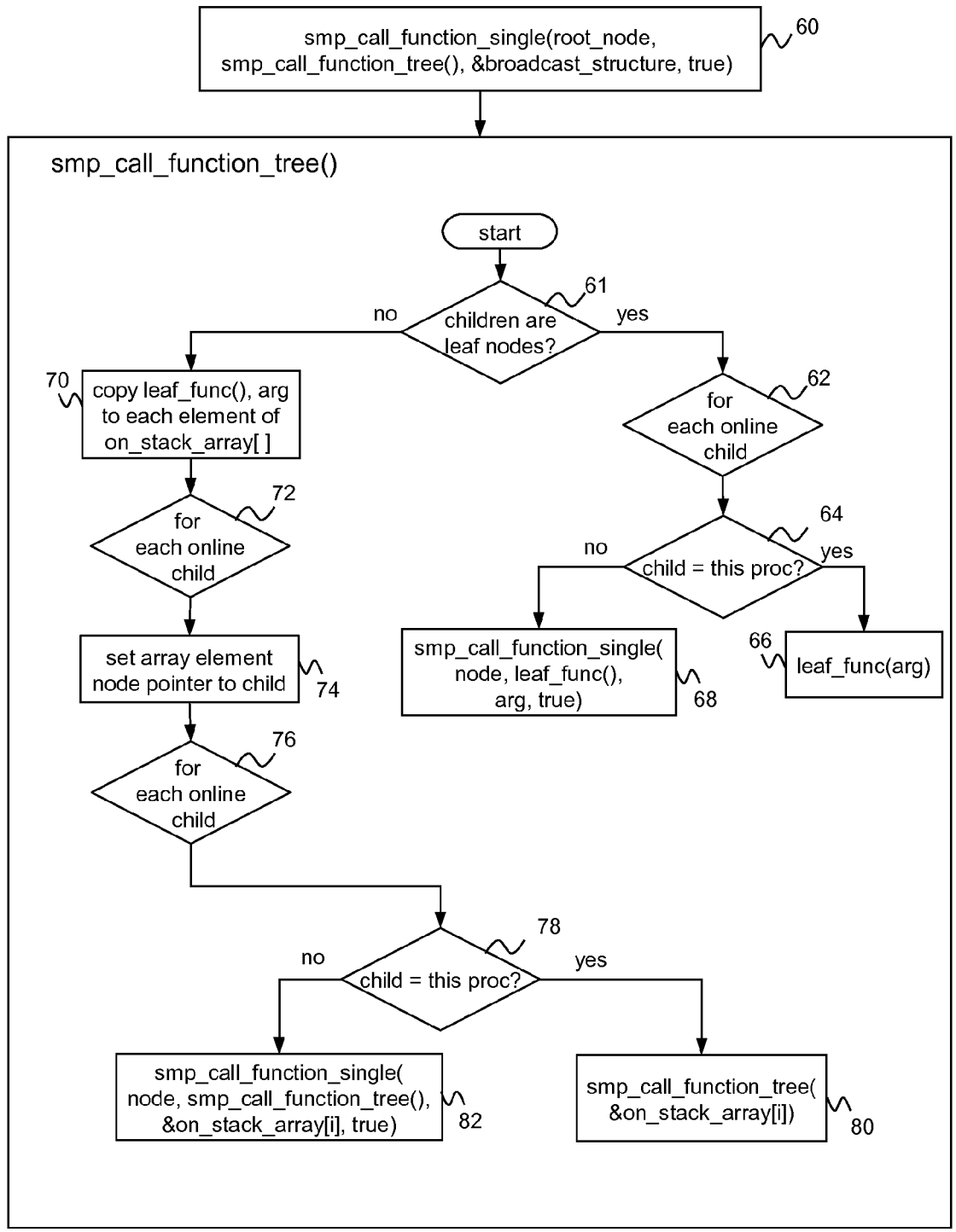
FIG. 6 is a flow diagram showing operations that may be performed in accordance with the first embodiment disclosed herein.

The format of the initial invocation of smp_call_function_single( ) on the root node's associated processor 4 is shown by block 60 in FIG. 6. The second argument to this function, named "smp_call_function_tree( )," is the node processing work function to be executed by the root node processor 4. This work function will also be implemented recursively on each processor associated with an internal node 24 until the desired synchronization operation is performed on all leaf node processors. FIG. 6 shows the example node processing operations that the node processing work function may perform. Block 61 checks whether the node's children are leaf nodes 26. If they are, block 62 iterates through blocks 64-68 for each leaf node 26 whose associated processor 4 is online. Block 64 determines whether the processor 4 associated with the leaf node 26 is the current processor 4 that is executing smp_call_function_tree( ). If it is, block 66 obtains the leaf function and argument from the broadcast structure passed in by smp_call_function_single( ), and then performs the desired synchronization action with respect to itself by calling the function and passing it the argument. If block 64 determines that the processor 4 associated with the leaf node 26 is not the current processor, block 68 calls smp_call_function_single( ) on the processor, passing the leaf function and argument from the broadcast structure that was passed in, and indicating that the caller must wait until smp_call_function_single( ) has completed. This results in the processor 4 associated with this leaf node 26 performing the desired synchronization action with respect to itself.

It will be seen that the operations of blocks 62-68 will result in a synchronization operation being performed on all processors 4 associated with leaf nodes 26 that are children of the current node. Alternative processing is performed if block 61 determines that the current node's children are not leaf nodes 26 (i.e., because they are internal nodes 24). In that case block 70 creates the broadcast array 50 (with one array element per child internal node 24) and copies the leaf function and its argument from the broadcast structure 30 to each array element. In some implementations of smp_call_function_single( ), it may be possible to create the broadcast array 50 as an on-stack array. In other implementations, the array 50 may need to be allocated on a per-processor basis. Block 72 iterates on block 74, which sets the node pointer in an element of the array 50 to point to one of the current node's child internal nodes 24. Block 76 iterates through blocks 78-82 for each child internal node 24 whose associated processor 4 is online. Block 78 determines whether the processor 4 associated with the child internal node 24 is the current processor 4 that is executing smp_call_function_tree( ). If it is, block 80 recursively calls smp_call_function_tree( ) on itself (i.e., the current processor 4), passing the corresponding element of the broadcast array 50. If block 78 determines that the processor 4 associated with the child internal node 24 is not the current processor, block 82 recursively calls smp_call_function_single( ) on the processor, passing a pointer to the child internal node 24, the node processing function smp_call_function_tree( ), the corresponding element of the broadcast array 50, and an indication that the caller wait until smp_call_function_single( ) has completed. The operations of blocks 80 and 82 will result in a fan out and repetition of the node processing operations of smp_call_function_tree( ), effectively using each child internal node 24 as a new root node. Note that the operations of blocks 76-82 may be implemented as a loop on large systems due to stack-depth considerations. It will be seen that the processing performed by repeated invocation of smp_call_function_tree( ) while traversing the hierarchical tree 20 to a lowest level of the internal nodes 24 will result in the desired synchronization operation requested by a writer 18 being performed in distributed parallelized fashion on all processors 4 associated with the leaf nodes 26. This will result in the synchronization operation being performed more quickly than the current Linux® kernel implementation of synchronize_sched_expedited( ), particularly when there is a large number of processors, such that writer latency will be reduced. It should be noted that some implementations of smp_call_function_single( ) may require the use of softirq context or workqueue/kthread context in order to allow the function to call itself recursively.

Second Embodiment Based on Hsieh and Weihl

In this embodiment, the RWS subsystem 20 of FIG. 1 implements a modified version of the reader-writer locking technique disclosed in Hsieh and Weihl, "Scalable Reader/Writer Locks for Parallel Systems", 1991. With additional reference now to FIG. 7, this technique may utilize a distributed reader/writer (R/W) lock 85 that is local to each processor 4 in the computer system 2. Readers 21 desiring to access the shared data 16 for reading would acquire the local reader/writer lock 85 that is associated with the reader's current processor 4, which may be stored locally in the processor's 4 cache memory 10, thus avoiding operations involving the memory 8. On the other hand, a writer 18 desiring to update the shared data 16 would need to acquire each of the per-processor reader/writer locks 85.

A solution presented by the present embodiment is to have the writers 18 initiate a distributed synchronization operation that parallelizes the acquisition of the reader/writer lock 85 on the various processors 4, with multi-stage hierarchical broadcast processing being carried out using the hierarchical tree 20 of FIG. 2. This approach allows IPIs to be broadcast in parallel on platforms where broadcast IPIs are not supported, or do not efficiently handle large numbers of processors, or where an alternative to hardware-based broadcast IPIs is otherwise desirable for performance or functional reasons. No additional data structures other than the hierarchical tree 20 are required.

Figure 8:
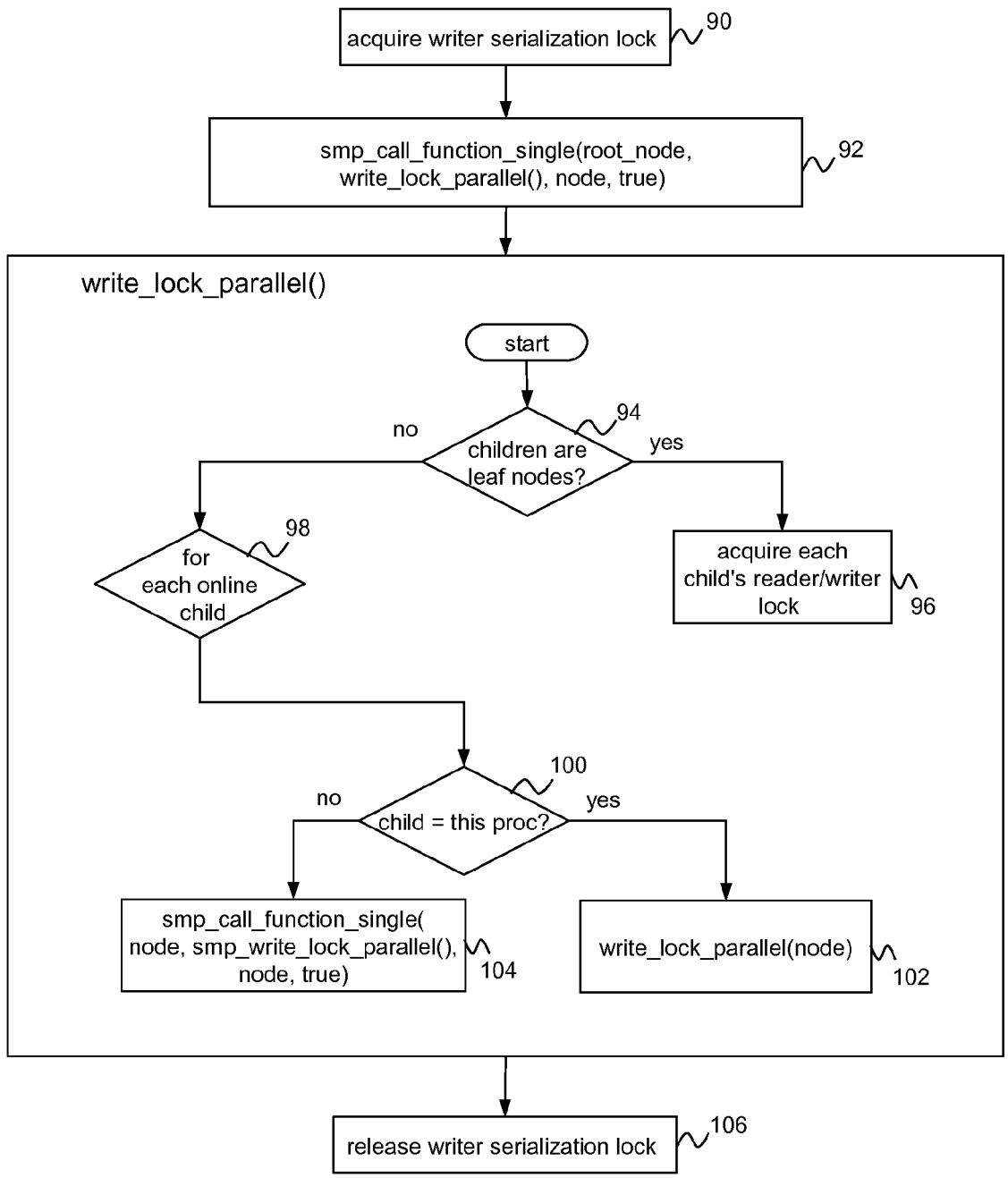
FIG. 8 is a flow diagram showing operations that may be performed in accordance with the second embodiment disclosed herein.

To perform a broadcast IPI that sets the reader/writer locks 85 associated with each processor 4 in the computer system 2, a writer 18 invoking such processing preferably acquires a writer serialization lock, as shown in block 90 of FIG. 8. In block 92, the Linux® kernel's smp_call_function_single( ) function may be called initially on the processor 4 associated with the root node 22 of the hierarchical tree 20. The arguments passed to the smp_call_function_single( ) function are (1) a pointer to the node whose processor 4 is to perform the function, (2) a node processing work function called "write_lock_parallel( )" to be executed by the processor, (3) a node pointer to be used as an argument for write_lock_parallel( ), and (4) an indication that the caller must wait until smp_call_function_single( ) has completed. Once smp_call_function_single( ) is invoked, the node processing implemented by write_lock_parallel will proceed in the manner shown in blocks 94-104 of FIG. 8. The operations of write_lock_parallel( ) will first be performed on the root node's associated processor 4, and then will be recursively invoked on each internal node 24 of the hierarchical tree 20 until the internal nodes have performed the required synchronization operation with respect to the leaf node processors' reader/writer locks 85.

Block 94 checks whether the node's children are leaf nodes 26. If they are, block 96 sets the reader/writer lock 85 for each leaf node's associated processor 4. It will be seen that the operations of block 96 will result in the desired synchronization action being performed with respect to all processors associated with the leaf nodes 26 that are children of the current node. Alternative processing is performed if block 94 determines that the current node's children are not leaf nodes 26, i.e., because they are lower level internal nodes 24. In that case block 98 iterates through blocks 100-104 for each child internal node 24 whose associated processor 24 is online. Block 100 determines whether the processor 4 associated with the child internal node 24 is the current processor 4 that is executing write_lock_parallel( ). If it is, block 102 recursively calls write_lock_parallel( ) on itself (i.e., the current processor 4), passing a pointer to the child internal node 24 as the function parameter. If block 100 determines that the processor 4 associated with the child internal node 24 is not the current processor, block 104 recursively calls smp_call_function_single( ) on the processor, passing a pointer to the child internal node 24, the node processing function write_lock_parallel( ) another pointer to the child internal node 24 as the write_lock_parallel( ) function parameter, and an indication that the caller must wait until smp_call_function_single( ) has completed. The operations of blocks 102 and 104 will result in a fan out and repetition of the node processing operations of write_lock_parallel( ), effectively using each child internal node 24 as a new root node. Note that the operations of blocks 98-104 may be implemented as a loop on large systems due to stack-depth considerations.

It will be seen that the processing performed by repeated invocation of write_lock_parallel( ) while traversing the hierarchical tree 20 to a lowest level of the internal nodes 24 will result in the desired synchronization operation requested by a writer 18 being performed with respect to all processors 4 associated with the leaf nodes 26 in distributed parallelized fashion. In particular, the reader/writer locks 85 for these processors 4 will be acquired. At that point, the writer 18 may complete its update operation using block 106 to release the writer serialization lock that was acquired in block 90.

Advantageously, the synchronization operation will be performed more quickly than if non-parallelized processing is used, particularly when there is a large number of processors, such that writer latency will be reduced. It should be noted that some implementations of this embodiment may require the use of softirq context or workqueue/kthread context in order to facilitate smp_call_function_single( ) calling itself recursively. It will also be appreciated that a writer 18 may use similar processing to perform a distributed synchronization operation that releases the reader/writer locks 85 following and update operation.

In a variation of this embodiment, processor's reader/writer lock 85 may include a flag indicating whether it was most recently acquired or released on behalf of a writer. In that case, the processing of FIG. 8 may be modified to use the flag to determine whether to acquire or release a leaf node processor's reader/writer lock 85, flipping the flag state as it does so. In a further variation of the present embodiment, the processing of FIG. 8 may be used for acquiring/releasing multiple locks. In that case, it may be desirable to record a pointer to the lock to be used in a broadcast structure such as that described in connection with the first embodiment.

Third Embodiment for User Space Hsieh and Weihl

In this embodiment, the RWS subsystem 20 of FIG. 1 implements a modified user-mode version of the reader-writer locking technique disclosed in Hsieh and Weihl, "Scalable Reader/Writer Locks for Parallel Systems", 1991. With additional reference now to FIG. 9, this technique may utilize a distributed reader/writer (R/W) lock 110 that is local to each thread of a user-mode application. The reader/writer lock 110 may include a lock flag for indicating the status of the lock and a lock variable (called "lock_variable") representing the actual lock. The lock flag of a given reader/writer lock 110 will be set if the lock is being held on behalf of a writer 18 and cleared otherwise. The user-mode threads may be implemented using operating system-supported POSIX threads (pthreads). Each leaf node 26 of the hierarchical tree 20 shown in FIG. 2 is associated with a "worker thread" that comprises a conventional part of the user-mode application and is associated with one of the reader-writer locks 110. In the present embodiment, the writers 18 and the readers 21 shown in FIG. 1 would be embodied within such worker threads. The root node 22 and the internal nodes 24 of the hierarchical tree are associated with "helper threads" that act on behalf of writers 18 to acquire/release the reader/writer locks 110 associated with the worker threads. FIG. 10 illustrates a partial listing of thread variables (called "thread_data") for an example thread 120. The thread 120 is a POSIX pthread whose variables include a node counter, a pthread_mutex_t lock, and a pair of first and second condition variables that are guarded by the pthread_mutex_t lock. The thread 120 may be used as a model for the helper threads, and its thread_data variables may also be included in the worker threads in order to facilitate the operations of FIGS. 11-12 now to be described.

Figure 12:
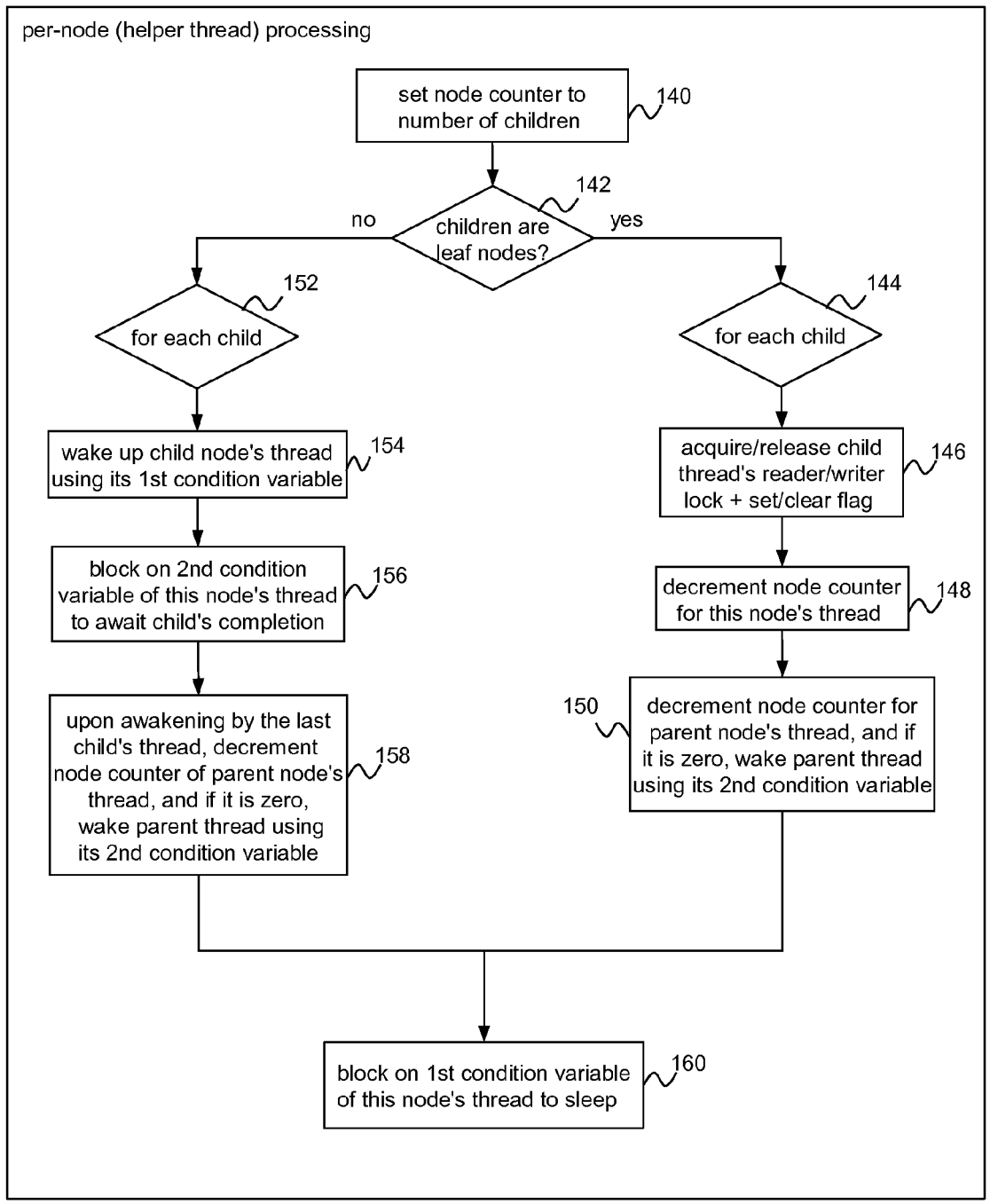
FIG. 12 is a flow diagram showing operations that may be performed following the operations of FIG. 11 in accordance with the third embodiment disclosed herein.

Example processing that may be initiated by a writer 18 to write-acquire all of the distributed reader/writer locks 110 for a given user-mode application are shown in FIGS. 11 and 12. This processing represents a distributed synchronization operation that parallelizes the acquisition of the reader/writer locks 110 associated with all the user-mode application's worker threads, with multi-stage hierarchical broadcast processing being carried out using the hierarchical tree 20 of FIG. 2. FIG. 11 illustrates example operations of a function that may be called by a writer 18 (embodied within an application thread) to initiate the distributed synchronization operation. In FIG. 11, this function is named "acquire_per_thread_reader_writer_lock( )." Block 130 acquires a writer serialization lock that serializes writer access to the reader/writer locks 110. Block 132 wakes up the helper thread 120 associated with the root node 22 of the hierarchical tree 20. This may be done by setting the root node helper thread's first condition variable protected by the pthread_mutex_t lock. Waking up the root node's helper thread starts the per-node processing operations described below in connection with FIG. 12. In block 134, the writer 18 blocks on the root node helper thread's second condition variable, which is again protected by the pthread_mutex_t lock. This will cause the writer 18 to be awakened by the root node helper thread 120 when the distributed synchronization operation has completed. Block 136 thereafter releases the writer serialization lock.

Turning now to FIG. 12, each helper thread 120 associated with the root node 22 and the internal nodes 24 of the hierarchical tree 20 operates in an infinite loop that comprises the processing of blocks 140-160. Upon entering the loop in block 140, the helper thread's node counter is set to the number of children that the current node has in the hierarchical tree 20. Block 142 determines whether the current node's children are leaf nodes 26. If they are, block 144 iterates through blocks 146-148 for each child. Block 146 manipulates the reader/writer lock 110 of the child node's worker thread according to the current status of the lock flag. If the lock flag is cleared, block 146 sets it and acquires the reader/writer lock 110. If the lock flag is set, block 146 clears it and releases the reader/writer lock 110. Block 148 decrements the node counter of the current node's helper thread (i.e., the node counter that was set in block 140). After all of the current node's children have been processed in blocks 144-148, the node counter set in block 140 will be zero, indicating that the current node's worker thread has completed its work. Block 150 notes this by decrementing the node counter of the parent node's thread. If this counter is zero, the parent node's thread is awakened using its second condition variable protected by the pthread_mutex_t lock. Note that the counter decrementing operation of block 150 may not be needed for the root node 22 because it is called by the writer 18. The root node's helper thread can simply wake up the writer 18. Alternatively, the writer 18 could set its node counter to a value of "1" in block 132 of FIG. 11 to indicate that it only waits for one node, namely, the root node 22.

If block 142 determines that the current node's children are not leaf nodes 26, block 152 iterates through blocks 154-156. Block 154 wakes up the child node's helper thread using its first condition variable protected by the pthread_mutex_t lock. In block 156, the current node's helper thread block's on its second condition variable that is protected by the pthread_mutex_t lock. The current node's helper thread thus waits until the helper threads associated with its child nodes have completed. Note that if there is a large number of children per node, the operations of blocks 154 and 156 may be performed in two passes, first waking each child node's helper thread and then blocking to wait for each child thread's completion. As each awakening occurs, the current node's helper thread will check its node counter to see if it has been decremented to zero. This condition signifies that the helper thread's associated with all of the current node's children have completed their work. Block 158 notes this by decrementing the node counter of the parent node's thread. If this counter is zero, the parent node's thread is awakened using its second condition variable protected by the pthread_mutex_t lock. Again, the parent counter checking step may not be needed if the current node is the root node 22 that was called by a writer 18.

Block 160 is reached following blocks 150 and 158. At this point, the current node's helper thread will have woken up the parent node's thread (or the writer 18 if the current node is the root node 22). In that case, the current node's work is done and it therefore blocks on its first condition variable protected by the pthread_mutex_t lock in order to sleep.

It will be seen that the processing performed by repeated invocation of per-node helper thread processing of FIG. 12 while traversing the hierarchical tree 20 to a lowest level of the internal nodes 24 will result in the desired synchronization operation requested by a writer 18 being performed with respect to all worker threads associated with the leaf nodes 26 in distributed parallelized fashion. In particular, the reader/writer locks 110 for these threads will be acquired or released. At that point, the writer 18 may complete its update operation using block 136 of FIG. 11 to release the writer serialization lock that was acquired in block 130. Advantageously, the synchronization operation will be performed more quickly than if non-parallelized processing is used, particularly when there is a large number of thread, such that writer latency will be reduced.

Accordingly, a technique for has been disclosed for expediting a synchronization operation by a writer in large multi-processor or multithreaded systems. It will be appreciated that the foregoing concepts may be variously embodied in any of a data processing system, a machine implemented method, and a computer program product in which programming logic is provided by one or more machine-useable storage media for use in controlling a data processing system to perform the required functions. Example embodiments of a data processing system and machine implemented method were previously described in connection with FIGS. 1-12. With respect to a computer program product, digitally encoded program instructions may be stored on one or more computer-readable data storage media for use in controlling a computer or other information handling machine or device to perform the required functions. The program instructions may be embodied as machine language code that is ready for loading and execution by the machine apparatus, or the program instructions may comprise a higher level language that can be assembled, compiled or interpreted into machine language. Example languages include, but are not limited to C, C++, assembly, to name but a few. When implemented on a machine comprising a processor, the program instructions combine with the processor to provide a particular machine that operates analogously to specific logic circuits, which themselves could be used to implement the disclosed subject matter.

Figure 13:
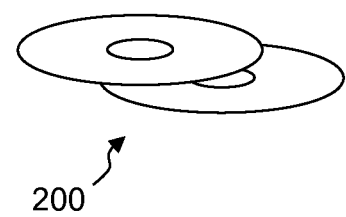
FIG. 13 is a diagrammatic illustration showing example media that may be used to provide a computer program product in accordance with the present disclosure.

Example data storage media for storing such program instructions are shown by reference numerals 8 (memory) and 10 (cache) of the computer system 2 of FIG. 1. The system 2 may further include one or more secondary (or tertiary) storage devices (not shown) that could store the program instructions between system reboots. A further example of media that may be used to store the program instructions is shown by reference numeral 200 in FIG. 13. The media 200 are illustrated as being portable optical storage disks of the type that are conventionally used for commercial software sales, such as compact disk-read only memory (CD-ROM) disks, compact disk—read/write (CD-R/W) disks, and digital versatile disks (DVDs). Such media can store the program instructions either alone or in conjunction with an operating system or other software product that incorporates the required functionality. The data storage media could also be provided by portable magnetic storage media (such as floppy disks, flash memory sticks, etc.), or magnetic storage media combined with drive systems (e.g. disk drives). As is the case with the memory 8 and the cache 10 of FIG. 1, the storage media may be incorporated in data processing platforms that have integrated random access memory (RAM), read-only memory (ROM) or other semiconductor or solid state memory. More broadly, the storage media could comprise any electronic, magnetic, optical, infrared, semiconductor system or apparatus or device, or any other tangible entity representing a machine, manufacture or composition of matter that can contain, store, communicate, or transport the program instructions for use by or in connection with an instruction execution system, apparatus or device, such as a computer. For all of the above forms of storage media, when the program instructions are loaded into and executed by an instruction execution system, apparatus or device, the resultant programmed system, apparatus or device becomes a particular machine for practicing embodiments of the method(s) and system(s) described herein.

Although various example embodiments have been shown and described, it should be apparent that many variations and alternative embodiments could be implemented in accordance with the disclosure. For example, as mentioned in the Background section above, the techniques disclosed herein are also useful for other synchronization operations, such as expedited grace period detection in multiprocessor systems implementing read-copy update (RCU) synchronization. It is understood, therefore, that the invention is not to be in any way limited except in accordance with the spirit of the appended claims and their equivalents.

What is claimed is:

1. A method of operation in a computer system having multiple processors operatively coupled to a memory, said memory including a computer useable medium tangibly embodying at least one program of instructions executable by said processor to perform operations representing said method, said operations comprising:

implementing a data synchronization mechanism for synchronizing access to shared data stored in said memory by readers and writers of said data that execute on said processors, said synchronization mechanism requiring said writers to periodically perform a distributed synchronization operation with respect to a plurality of said processors or plural threads of execution running on said processors;

establishing in said memory a hierarchical tree data structure having a set of nodes that includes a root node, one or more levels of internal nodes and a plurality of leaf nodes, there being a leaf node for each of said processors or threads used by said writers to perform said synchronization operation, and each of said leaf nodes, said internal nodes and said root node storing an identifier that associates said node with one of said processors or with one of said threads, said nodes being interconnected by links that establish parent-child relationships between said nodes such that said hierarchical tree data structure is traversable from said root node through said internal nodes to reach said leaf nodes;

parallelizing said synchronization operation by traversing said nodes from said root node to a lowest level of said internal nodes and performing the following node processing for each node:

determine whether said node's children are leaf nodes or internal nodes;

if said node's children are leaf nodes, perform said synchronization operation with respect to each leaf node's associated processor or thread; and if said node's children are internal nodes, fan out and repeat said node processing using each internal node as a new root node;

said node processing being continued until said synchronization operation has been performed with respect all processors or threads associated with said leaf nodes.

2. A method in accordance with claim 1, wherein said synchronization operation comprises performing a processor context switch in order to end a grace period.

3. A method in accordance with claim 2, wherein said grace period is initiated by one of said writers to allow said readers to pass through a quiescent state before said writer acquires a reader-writer lock.

4. A method in accordance with claim 1, wherein said synchronization operation comprises acquiring or releasing a per-processor or per-thread reader-writer lock for writing.

5. A method in accordance with claim 1, wherein said node processing is initiated by calling a first function on a processor associated with said root node, said first function passing a second function representing said node processing to be performed by said processor associated with said root node and by processors associated with said internal nodes, said first function also passing a data structure containing a pointer to a third function that performs said synchronization operation, said synchronization operation being implemented by processors associated with said leaf nodes.

6. A method in accordance with claim 1, wherein said node processing is initiated by calling a first function on a processor associated with said root node, said first function passing a second function representing said node processing to be performed by said processor associated with said root node and by processors associated with said internal nodes, and said second function also conditionally performing said synchronization operation on behalf of internal nodes whose children are leaf nodes, said synchronization operation being performed by processors associated with said internal nodes to manipulate synchronization entities managed by processors associated with said leaf nodes.

7. A method in accordance with claim 1, wherein said node processing is initiated by waking up a helper thread associated with said root node that in turn wakes up helper threads associated with said internal nodes, each of said helper threads performing said node processing for its associated node, said helper threads also conditionally performing said synchronization operation on behalf of internal nodes whose children are leaf nodes, said synchronization operation being performed by said internal node helper threads to manipulate synchronization entities managed by threads associated with said leaf nodes.

* * * * *